(12) United States Patent
Takamatsu et al.

(10) Patent No.: US 8,936,230 B2
(45) Date of Patent: Jan. 20, 2015

(54) NORMALLY OPEN ELECTROMAGNETIC VALVE

(75) Inventors: Yoshiyuki Takamatsu, Ueda (JP); Tetsuo Sasaki, Ueda (JP)

(73) Assignee: Nissin Kogyo Co., Ltd, Nagano (JP)

( * ) Notice: Subject to any disclaimer, the term of this patent is extended or adjusted under 35 U.S.C. 154(b) by 168 days.

(21) Appl. No.: 13/431,228

(22) Filed: Mar. 27, 2012

(65) Prior Publication Data

US 2012/0248354 A1    Oct. 4, 2012

(30) Foreign Application Priority Data

Mar. 31, 2011  (JP) ................................. 2011-080211

(51) Int. Cl.
| | |
|---|---|
| F16K 31/02 | (2006.01) |
| F16K 31/06 | (2006.01) |
| B60T 8/36 | (2006.01) |
| H01F 7/08 | (2006.01) |

(52) U.S. Cl.
CPC ............ F16K 31/0655 (2013.01); B60T 8/367 (2013.01); H01F 2007/086 (2013.01)
USPC ............... 251/129.02; 251/129.15; 303/119.2

(58) Field of Classification Search
USPC ........... 251/129.02, 129.15; 303/119.1, 119.2
See application file for complete search history.

(56) References Cited

U.S. PATENT DOCUMENTS

| | | | | |
|---|---|---|---|---|
| 6,152,420 | A * | 11/2000 | Hohl ......................... | 251/129.02 |
| 6,755,390 | B2 * | 6/2004 | Masuda et al. ............. | 251/30.03 |
| 7,125,085 | B2 * | 10/2006 | Ohsaki et al. .............. | 303/119.1 |
| 7,168,679 | B2 * | 1/2007 | Shirase et al. ............ | 251/129.02 |
| 8,220,776 | B2 * | 7/2012 | Tagata et al. ............. | 251/129.02 |
| 2004/0026643 | A1 * | 2/2004 | Hayakawa et al. ....... | 251/129.15 |
| 2004/0150260 | A1 * | 8/2004 | Inagaki et al. ............. | 303/113.1 |
| 2005/0001189 | A1 * | 1/2005 | Takamatsu et al. ....... | 251/129.15 |
| 2008/0191156 | A1 * | 8/2008 | Shigeta et al. ............ | 251/129.02 |

FOREIGN PATENT DOCUMENTS

| | | |
|---|---|---|
| JP | 60024983 U | 2/1985 |
| JP | 3008240 B | 8/1994 |
| JP | 2008196642 A | 8/2008 |
| JP | 4285354 B2 | 6/2009 |

OTHER PUBLICATIONS

Japanese Patent Office Action for Application No. 2011-080211, drafting date—Feb. 12, 2013, 4 pages.

* cited by examiner

*Primary Examiner* — Elizabeth Houston
*Assistant Examiner* — Ian Paquette
(74) *Attorney, Agent, or Firm* — Andrew M. Calderon; Roberts Mlotowski Safran & Cole, P.C.

(57) ABSTRACT

A normally open electromagnetic valve includes: a fixed core; a movable core which is driven when excited; a valve seat member in the fixed core and having a funnel-shaped valve seat surface; a valve member disposed so that the valve member advances or retreats together with the movable core with one end of the valve member kept in contact with the movable core, and that the other end of the valve member closes or opens a flow passage by coming into contact with or separates from the valve seat surface; and a return spring. The fixed core has a cylindrical holding hole. The valve member advances or retreats being guided by the holding hole in sliding contact with the holding hole. The movable core has a projection which projects toward the fixed core and which is directly inserted into the holding hole.

20 Claims, 4 Drawing Sheets

NORMALLY OPEN ELECTROMAGNETIC VALVE

CROSS REFERENCE TO RELATED APPLICATION(S)

The present disclosure relates to the subject matters contained in Japanese Patent Application No. 2011-080211 filed on Mar. 31, 2011, which are incorporated herein by reference in its entirety.

FIELD

One or more embodiments of the present invention relate to a normally open electromagnetic valve and, more particularly, to a linear solenoid valve capable of varying the produced differential pressure according to the value of current flowing through a coil.

BACKGROUND

In general, electromagnetic valves (solenoid valves) are equipped with a coil, a fixed core, and a movable core and are configured as follows. The movable core is excited by generating a magnetic field by a current flowing through the coil, whereby the movable core and the fixed core attract each other and the valve is opened or closed by this attraction force.

Normally open electromagnetic valves are equipped with a return spring to open the valve by moving a valve member away from a valve seat surface in an ordinary operation state. The valve member is pressed against the valve seat surface when the coil is energized.

Incidentally, in linear solenoid valves in which the produced differential pressure can be varied according to the value of current flowing through the coil, the valve member is slightly separated from the valve seat surface in a differential pressure control state. If a ripple occurs in the fluid pressure in this state, the valve member may be rendered unstable being affected by such a variation in the fluid pressure. In view of the above, JP-B-3,008,240, JP-UM-A-60-24983, and JP-A-2008-196642 disclose structures for stabilizing the movable core and the valve member when the movable core has moved to the valve closing side by causing magnetic force to act between the movable core and the fixed core in the radial direction. More specifically, the movable core is provided with a projection which projects toward the fixed core and the fixed core is provided with a recess which corresponds to the projection in diameter in such a manner that the projection goes into the recess and is opposed to the recess in the radial direction when the valve is closed (i.e., during a differential pressure control).

However, in the structures disclosed in the above documents, the fixed core needs to be formed, by mechanical processing, with the recess to receive the projection of the movable core separately from a cylindrical sliding contact surface for supporting the valve member that is advancing or retreating. This processing causes an additional cost. Since the recess is larger in diameter than the sliding surface, the area of the end face, opposed to the movable core, of the fixed core is reduced. This results in a problem that a large current is necessary to produce strong thrust (valve closing force) in the advance/retreat direction of the movable core.

SUMMARY

An object of the embodiments is therefore to provide a normally open electromagnetic valve in which the valve member can be kept stable at a low cost and the movable core can be driven efficiently with low electric power.

According to the embodiments, there is provided a normally open electromagnetic valve including: a fixed core; a movable core which is disposed so as to be able to advance toward and retreat away from the fixed core and is driven when excited; a valve seat member provided in the fixed core and having a funnel-shaped valve seat surface; a valve member which is disposed so that the valve member advances or retreats together with the movable core with one end of the valve member kept in contact with the movable core, and that the other end of the valve member closes or opens a flow passage by coming into contact with or separates from the valve seat surface; and a return spring which urges the valve member away from the valve seat surface, wherein the fixed core has a cylindrical holding hole; wherein the valve member advances or retreats being guided by the holding hole in sliding contact with the holding hole; and wherein the movable core has a projection which projects toward the fixed core and which is directly inserted into the holding hole.

With the above configuration, the projection of the movable core is directly inserted into the holding hole by which the valve member is guided when it advances or retreats. Therefore, unlike in a related-art, the fixed core need not be formed with a recess by mechanical processing and hence the normally open electromagnetic valve can be manufactured at a low cost. By virtue of the structure in which the projection is directly inserted into the holding hole, the area of an end surface, opposed to the movable core, of the fixed core can be increased, whereby the movable core can be driven efficiently with lower electric power.

The above normally open electromagnetic valve may be such that when the movable core is located at an initial position where it is not excited, a tip surface of the projection is inserted in the holding hole past an end surface, opposed to the movable core, of the fixed core. In this case, an edge of the holding hole on the side of the movable core may be chamfered. When the movable core is located at the initial position, the tip surface of the projection may be located in the range of a chamfered face in an advance/retreat direction of the movable core.

Since at the initial position the projection of the movable core is slightly inserted in the holding hole, a radial attraction force acts between the movable core and the fixed core quickly upon excitation of the movable core, whereupon the valve member is stabilized.

The area of the end surface, opposed to the movable core, of the fixed core may be larger than the area of the tip surface of the projection. This makes it possible to increase the axial attraction force acting between the movable core and the fixed core and to thereby drive the movable core efficiently with low electric power.

The above normally open electromagnetic valve may be configured so that the attraction force acting between the movable core and the fixed core continues to increase gradually as the movable core moves from the initial position where the movable core is not excited to a valve closing position where it comes into contact with the valve seat surface. That is, it is desirable that the gap between the projection and the fixed core in the radial direction, the gap between the movable core and the fixed core in the advance/retreat direction, and the initial position of the projection with respect to the fixed core be set so as to attain such a characteristic.

Since the normally open electromagnetic valve is configured so that the attraction force acting between the movable core and the fixed core continues to increase gradually as the movable core moves, when it is attempted to produce strong valve closing force (differential pressure) around the valve closing position, the ratio of a variation of the differential pressure to a movement length of the movable core around the valve closing position is decreased, whereby the error of the differential pressure due to errors of various dimensions of the electromagnetic value can be made small around a practical use range of the differential pressure.

In the above normally open electromagnetic valve, the valve member may include a valve body which comes into contact with or separates from the valve seat surface, and a retainer one end of which is in contact with the movable core, the other end of which is connected to the valve body, and which advances or retreats being guided by the holding hole. That is, the valve member may be formed by either a single component or plural components.

According to the embodiments, in the normally open electromagnetic valves, it is possible to keep the valve member stable at a low cost and to drive the movable core efficiently with low electric power.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

Figure 1:
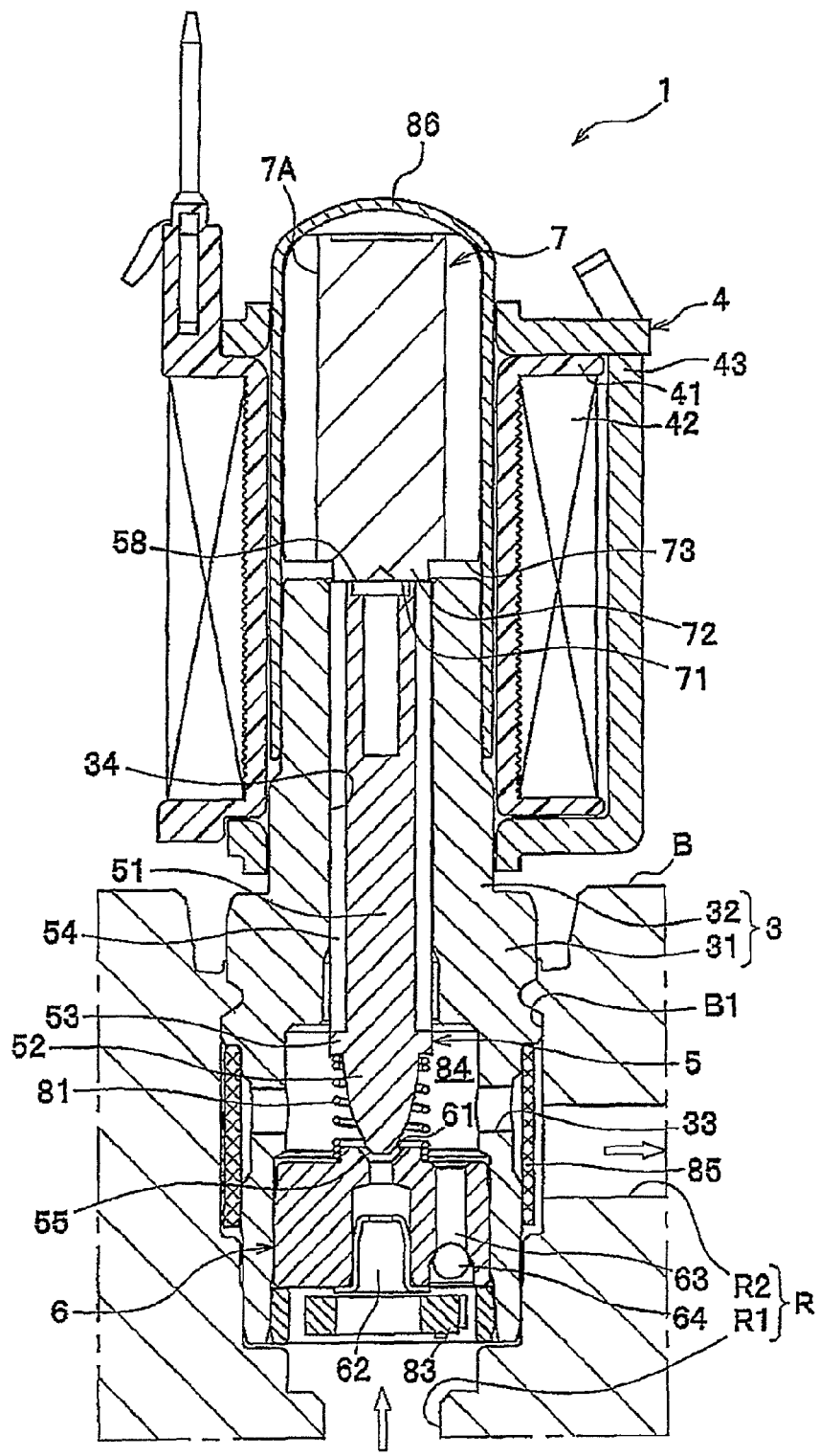
FIG. 1 is a longitudinal sectional view of a normally open electromagnetic valve according to an embodiment.

One or more embodiments of the present invention will be hereinafter described in detail by referring to the drawings when necessary. As shown in FIG. 1, a normally open electromagnetic valve 1 is a valve for switching between closing and opening of a flow passage R which is formed in a base body B of an antilock brake device, for example, and is mainly configured of a fixed core 3, a coil unit 4, a valve member 5, a valve seat member 6, and a movable core 7.

Figure 2:
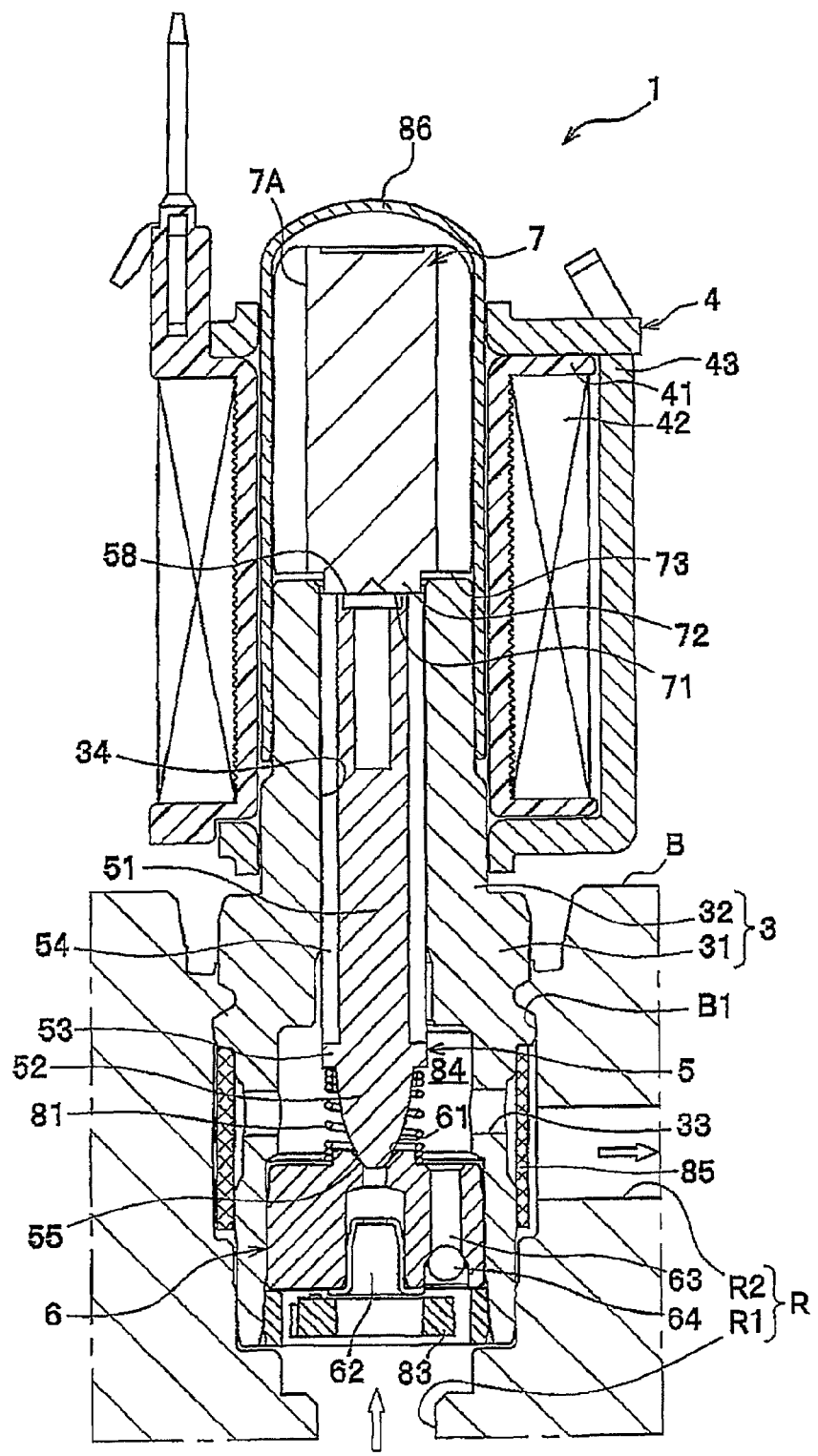
FIG. 2 is a longitudinal sectional view of the normally open electromagnetic valve in a state that a valve member is located at a valve closing position.

In the normally open electromagnetic valve 1, in an ordinary operation state, the valve member 5 is separated from the valve seat member 6 to allow operating fluid to flow from a flow passage R1 (which extends downward) into a flow passage R2 which extends sideways from the flow passage R1 (in this specification, for the sake of convenience, the top side and the bottom side are defined by those shown in FIG. 1). The movable core 7 is excited and driven by energizing the coil unit 4. When the valve member 5 comes into contact with the valve seat member 6 (see FIG. 2), the flow passage R is closed and the flow of operating fluid is stopped. The normally open electromagnetic valve 1 according to the embodiment is configured in such a manner that if the difference between the operating fluid pressure in the flow passage R1 and that in the flow passage R2 becomes larger than or equal to a prescribed value during an action, the flow of operating fluid due to the pressure difference surpasses the valve closing force acting on the valve member 5 and opens the flow passage R. That is, the normally open electromagnetic valve 1 is a linear solenoid valve (differential pressure control valve) capable of controlling the closing force of the valve member 5 according to the value of energization current of the coil unit 4.

The fixed core 3, which also serves as a housing which houses various components, is a cylindrical member having a vertical through-hole. Made of a magnetic material, the fixed core 3 has a function of closing the valve by attracting the movable core 7 when excited by the coil unit 4. The fixed core 3 is configured of a body 31 which is attached to the base body B and a core portion 32 which is smaller in outer diameter than the body 31 and extends upward. The valve member 5 and the valve seat member 6 are housed in the body 31.

The valve member 5 is configured of a shaft 51 which extends vertically and a bullet-shaped valve body portion 52 which is connected to the bottom end of the shaft 51. A brim 53 which is somewhat larger in diameter than the valve body portion 52 is formed at the boundary between the valve body portion 52 and the shaft 51.

A generally hemispherical sealing portion 55 to come into contact with or separate from a valve seat surface 61 of the valve seat member 6 (described below) is formed as a bottom portion of the valve body portion 52.

The valve seat member 6 is a substantially cylindrical member, and is formed with a funnel-shaped valve seat surface 61 at the top center. An inflow passage 62 penetrates vertically through the valve seat member 6 so as to reach the bottom of the valve seat surface 61. The inflow passage 62 is a passage through which operating fluid that comes from under the normally open electromagnetic valve 1 flows into a valve room 84 which is located over the valve seat member 6. A return passage 63 also penetrates vertically through the valve seat member 6 at a position that is deviated from the inflow passage 62 outward in the radial direction. A ball valve 64 is disposed in the return passage 63 at a bottom position, and constitutes a check valve together with the return passage 63. The ball valve 64 is prevented from coming off the valve seat member 6 by a filter 83 which is press-fitted in a bottom wall of the body 41. The filter 83 prevents foreign substances from entering the valve room 84 from the side of the flow passage R1.

The valve seat member 6 is press-fitted in and thereby fixed to the bottom wall of the body 41.

A return spring 81 for producing urging force for separating the valve member 5 from the valve seat member 6 is disposed between the top surface of the valve seat member 6 and the brim 53.

Plural through-holes 33 are formed through a side wall of the body 31 so that the inside and the outside of the body 31 communicate with each other. The portion of the body 31 where the through-holes 33 are formed is fitted with a cylindrical filter 85 which prevents foreign substances from entering the valve room 84 from the side of the flow passage R2.

The body 31 is inserted in a mounting hole B1 of the base body B and fixed to the base body B by caulking a portion, adjacent to the mounting hole B1, of the base body B.

A cylindrical holding hole 34 which is one size smaller in diameter than the valve room 84 is formed through the core portion 32, and the above-mentioned shaft 51 of the valve member 5 is disposed in the holding hole 34. The maximum diameter of the shaft 51 is slightly smaller than the inner diameter of the holding hole 34, and the valve member 5 advances or retreats in the vertical direction being guided by the holding hole 34 with the shaft 51 being in sliding contact with the holding hole 34. Since the valve member 5 is always urged upward by the return spring 81, a top surface 58 of the valve member 5 is in contact with a tip surface 71 of the movable core 7. As a result, the movable core 7 and the valve member 5 advance or retreat together in the vertical direction.

The shaft 51 of the valve member 5, in a side surface, is formed with grooves 54 over almost the entire length of the shaft 51 (the brim 53 is excluded). The grooves 54 enable smooth movement of the valve member 5 by allowing of operating fluid portions located over and under the valve member 5 to move when the valve member 5 is moved upward or downward.

The movable core 7 is a cylindrical member made of a magnetic material which is disposed over the fixed core 3 and the valve member 5. A projection 72 having a circular outline projects from the center of the bottom surface of the movable core 7. Being slightly smaller in diameter than the holding hole 34, the projection 72 can enter the holding hole 34. The outer circumferential surface of the movable core 7 is formed with plural grooves 7A which penetrate vertically through the movable core 7. The grooves 7A facilitate movement of the movable core 7 during an action of the movable core 7 because operating fluid portions existing in the spaces over and under the movable core 7 go up or down through the grooves 7A.

A guide cylinder 86 which is generally cylindrical and has a top wall is fitted with the core portion 32 and fixed to it by welding. The movable core 7 is housed in the guide cylinder 86 and guided by it when advancing or retreating in the vertical direction.

The coil unit 4 is configured in such a manner that a coil 24 is wound a resin bobbin 41 and a yoke 43 is disposed outside the bobbin 41 so as to form a magnetic path.

Figure 3:
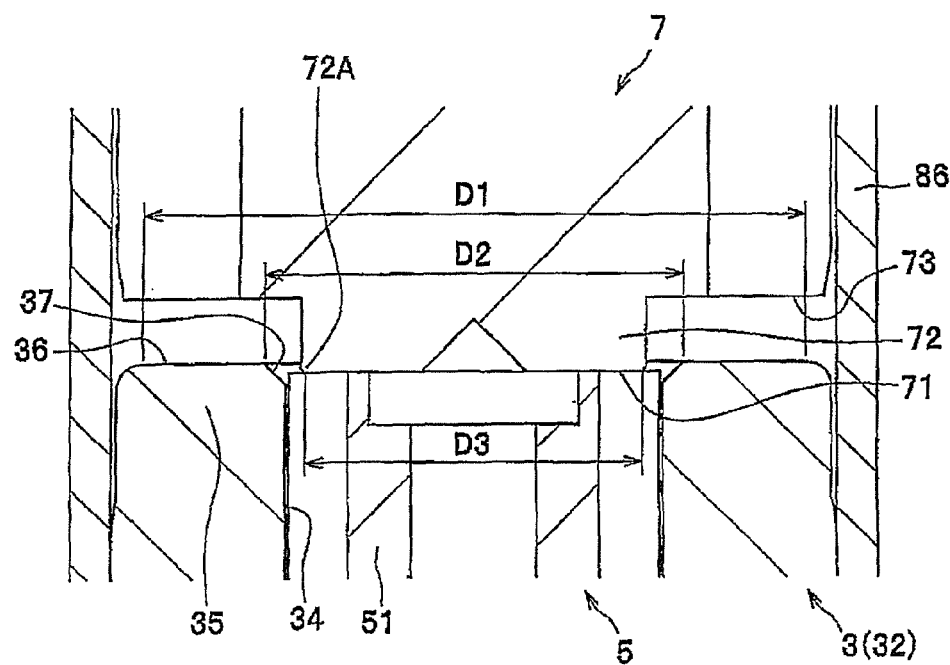
FIG. 3 is an enlarged sectional view of a projection of a movable core and members around it where the movable core is located at an initial position.

As shown in FIG. 3, when the movable core 7 is located at an initial position where it is not excited by the coil unit 4, the tip surface 71 of the projection 72 is located under the end surface 36, opposed to the movable core 7, of a top portion 35 of the fixed core 3 (i.e., inside the holding hole 34). More specifically, the movable-core-7-side edge of the holding hole 34 is formed with a very narrow chamfered face 37 and, when the movable core 7 is located at the initial position where it is not excited by the coil unit 4, the tip surface 71 of the projection 72 is located within the range of the chamfered face 37 in the advance/retreat direction of the movable core 7 (vertical direction). The very narrow chamfered face 37 serves to prevent formation of burrs and interference with the movable core 7.

Figure 5:
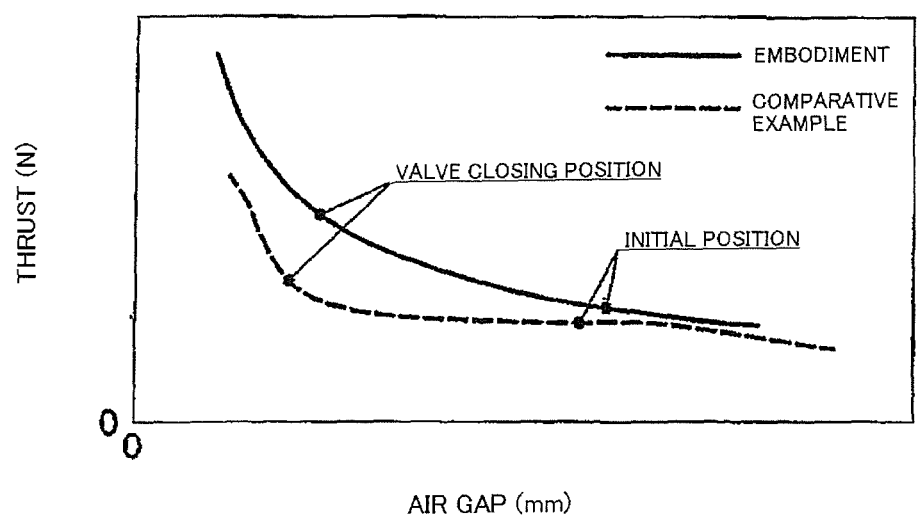
FIG. 5 is a graph showing a relationship between the air gap and the thrust of the movable core.

When the movable core 7 is located at the initial position, since the projection 72 is inserted in the holding hole 34 by a very small length, the force of attraction between an edge portion 72a of the projection 72 and an edge portion (the chamfered face 37 and its vicinity) of the holding hole 34 of the fixed core 3 has almost no component in the advance/retreat direction (vertical direction). Therefore, as shown in FIG. 5, when the movable core 7 is moved downward through excitation by the coil unit 4, increase of the attraction force (called thrust) in the advance/retreat direction due to approach, to the end surface 36 of the fixed core 3, of a confronting flat surface 73 of the movable core 7 (its bottom surface excluding the tip surface of the projection 72) dominates the thrust. Therefore, as the movable core 7 is moved from the initial position to the valve closing position (i.e., the position where the valve member 5 comes into contact with the valve seat surface 61), the thrust of the movable core 7 continues to increase gradually.

Figure 4:
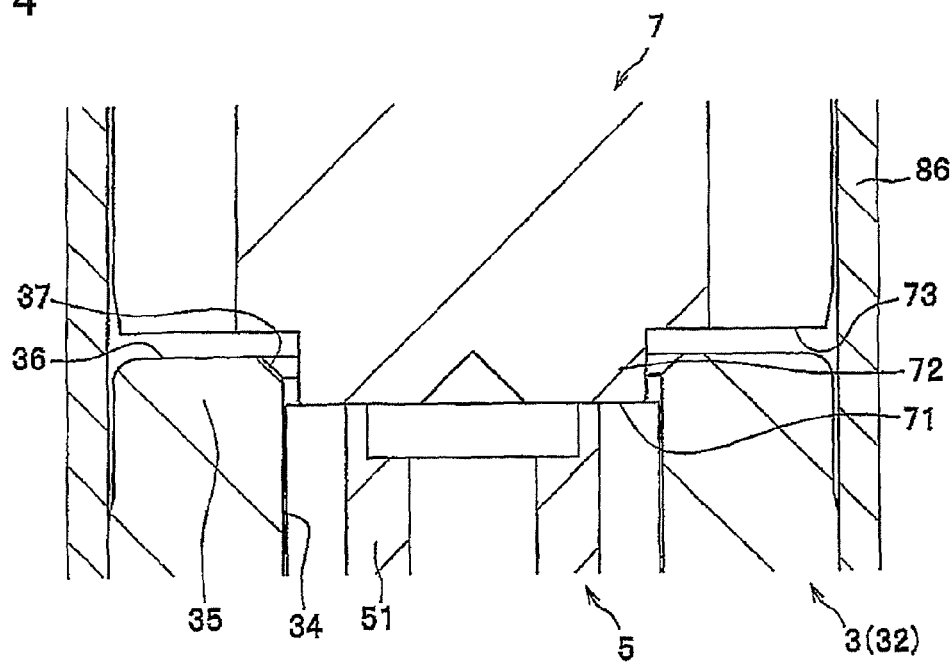
FIG. 4 is an enlarged sectional view of the projection of a movable core and the members around it where the movable core is located at a valve closing position.

As shown in FIG. 4, when the movable core 7 has been moved to the valve closing position, a large part of the projection 72 is located inside. Since the confronting area of the side surfaces of the projection 72 and the holding hole 34 is increased, the radial attraction force acting between the projection 72 and the holding hole 34 is increased. That is, in the normally open electromagnetic valve 1 according to the embodiment, since a bottom portion of the projection 72 is already located inside the holding hole 34 when the movable core 7 is located at the initial position, the confronting area of the side surfaces of the projection 72 and the holding hole 34 is increased quickly upon a start of downward movement of the movable core 7, whereby the valve member 5 can be made stable quickly. When the movable core 7 is located at the valve closing position (substantially, in operation), the radial attraction force acting between the projection 72 and the holding hole 34 can be made strong and hence the stability of the valve member 5 can be increased.

The area of the end surface 36, opposed to the movable core 7, of the fixed core 3 (i.e., the area of a circle having a diameter D1 minus the area of a circle having a diameter D2 (see FIG. 3)) is larger than the area of the tip surface 71 of the projection 72 (i.e., the area of a circle having a diameter D3 (see FIG. 3)). Increasing, in this manner, the area of the end surface 36 which is opposed to the flat surface 73 and contributes to the production of thrust makes it possible to drive the movable core 7 efficiently with low electric power. In the normally open electromagnetic valve 1 according to the embodiment, unlike in the related-art case, no recess into which the projection 72 is to be inserted is provided separately from the holding hole 34. Therefore, the step of forming such a recess by mechanical process can be omitted, and hence high stability of the valve member 5 can be secured at a low cost. The ratio between the area of the end surface 36 and the area of the tip surface 71 of the projection 72 can be set arbitrarily by adjusting the diameters D1, D2, and D3.

In the normally open electromagnetic valve 1 according to the embodiment, the error of the differential pressure can be kept small in attaining relatively strong thrust (differential pressure). FIG. 5 shows how the thrust varies as the movable core 7 is moved in each of a comparative example and the embodiment. The air gap is the interval between the movable core 7 and the fixed core 3 (i.e., the distance between the flat surface 73 and the end surface 36).

As shown in FIG. 5, a normally open electromagnetic valve of the comparative example in which a movable core is formed with a projection employs a characteristic that when the movable core is moved from an initial position to a valve closing position, almost no variation occurs in the thrust (i.e., the characteristic is approximately flat) at an early movement stage and the thrust increases steeply at a final movement stage where the movable core is close to the valve closing position. This is to prevent a large error from occurring in the thrust in an early drive stage even if the air gap has an error when the movable core is located at the initial position. On the other hand, in the embodiment, the thrust continues to increase gradually from the initial position to the valve closing position. Therefore, in attaining strong thrust, the error of the differential pressure due to an error of the air gap is smaller in the embodiment because the ratio of a variation of the thrust to a variation of the air gap at the valve closing position (in operation) (i.e., the slope of the curve at the valve closing position) is smaller.

Figure 6:
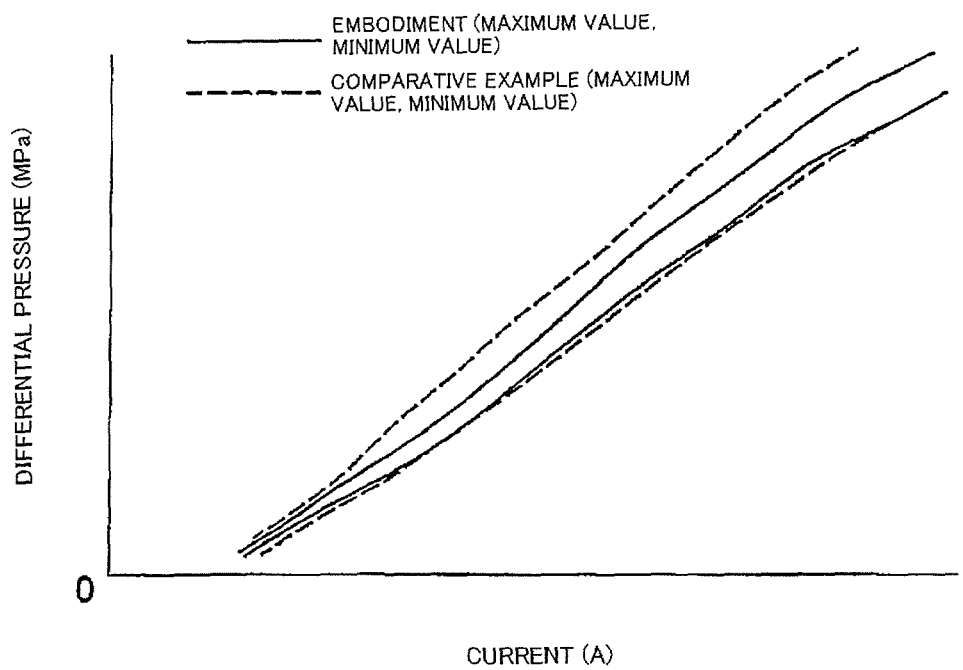
FIG. 6 is a graph showing a relationship between the current and the differential pressure and illustrating an error of the differential pressure.

FIG. 6 illustrates the above, that is, shows in what range (maximum value and minimum value) the produced differential pressure varies due to dimensional errors of individual components of each of the normally open electromagnetic valve 1 according to the embodiment and the normally open electromagnetic valve of the comparative example when a current flows through the coil unit. As seen from FIG. 6, in the embodiment, the variation of the differential pressure is smaller than in the comparative example because the variation rate of thrust is smaller near the valve closing position.

As described above, in the normally open electromagnetic valve 1 according to the embodiment, the projection 72 is inserted directly into the holding hole 34 without forming a recess into which the projection 72 is to be inserted. Therefore, the normally open electromagnetic valve 1 can be manufactured at a low cost and high stability of the valve member 5 can be secured. Since the fixed core 3 is not formed with a recess and hence has the large end surface 36, strong thrust for the movable core 7 can be produced with lower electric power, that is, the movable core 7 can be driven efficiently.

Although the embodiment of the invention has been described above, the invention is not limited to the embodiment and modifications can be made as appropriate. For example, although in the embodiment the valve member 5 is formed by a single component, as in the electromagnetic valve of JP-A-2008-196642, the valve member 5 may be made of a valve body which comes into contact with or separates from the valve seat surface 61 and a retainer one end of which is in contact with the movable core 7, the other end of which is connected to the valve body, and which is guided by the holding hole 34 when it advances or retreats.

Although the normally open electromagnetic valve 1 according to the embodiment is a linear solenoid valve (differential pressure control valve) in which the valve closing force of the valve member 5 can be controlled according to the value of current flowing through the coil unit 4, the invention can also be applied to a normally open electromagnetic valve in which switching between full opening and full closure is made by electric energization. In the normally open electromagnetic valve according to the invention, in an initial state, the projection may be either inserted or not inserted in the holding hole.

What is claimed is:

1. A normally open electromagnetic valve comprising:
   a fixed core;
   a movable core which is disposed so as to be able to advance toward and retreat away from the fixed core and is driven when excited;
   a valve seat member provided in the fixed core and having a funnel-shaped valve seat surface;
   a valve member which is disposed so that the valve member advances or retreats together with the movable core with one end of the valve member kept in contact with the movable core, and that the other end of the valve member closes or opens a flow passage by coming into contact with or separates from the valve seat surface; and
   a return spring which urges the valve member away from the valve seat surface,
   wherein the fixed core has a cylindrical holding hole with a constant diameter;
   wherein the valve member advances or retreats being guided by the cylindrical holding hole in sliding contact with the cylindrical holding hole;
   wherein the movable core has a projection which projects toward the fixed core and which is directly inserted into the cylindrical holding hole; and
   wherein the projection of the movable core is configured to press a top surface of the valve member.

2. The normally open electromagnetic valve according to claim 1,
   wherein an area of an end surface, opposed to the movable core, of the fixed core is larger than an area of the tip surface of the projection.

3. The normally open electromagnetic valve according to claim 1,
   wherein an attraction force acting between the movable core and the fixed core continues to increase gradually as the movable core moves from an initial position where the movable core is not excited to a valve closing position where the valve member comes into contact with the valve seat surface.

4. The normally open electromagnetic valve according to claim 1, wherein the valve member comprises:
   a valve body which comes into contact with or separates from the valve seat surface; and
   a retainer one end of which is in contact with the movable core, the other end of which is connected to the valve body, and which advances or retreats being guided by the holding hole.

5. The normally open electromagnetic valve according to claim 1, wherein the movable core has a flat surface opposed to an end surface of the fixed core and the projection projects at a center of the flat surface toward the fixed core.

6. The normally open electromagnetic valve according to claim 1, wherein the valve member includes a shaft formed with grooves.

7. The normally open electromagnetic valve according to claim 1, wherein the holding hole is smaller in diameter than a valve room formed through a core portion, and above a shaft of the valve member disposed in the holding hole.

8. The normally open electromagnetic valve according to claim 1, wherein when the movable core is located at an initial position where the movable core is not excited, a tip surface of the projection is inserted in the holding hole past an end surface, opposed to the movable core, of the fixed core.

9. The normally open electromagnetic valve according to claim 8,
   wherein an edge of the holding hole on a side of the movable core is chamfered; and
   wherein when the movable core is located at the initial position, the tip surface of the projection is located within a range of a chamfered face in an advance/retreat direction of the movable core.

10. The normally open electromagnetic valve according to claim 1,
    wherein the projection of the movable core is configured to press the valve member, such that the projection of the moveable core moves from a chamfered area of the fixed core into the cylindrical holding hole.

11. The normally open electromagnetic valve according to claim 10, wherein the movable core has a flat surface opposed to an end surface of the fixed core and the projection projects at a center of the flat surface toward the fixed core.

12. The normally open electromagnetic valve according to claim 11,
    wherein the fixed core has a body and a core portion;
    wherein the core portion has a smaller diameter than an outer diameter of the body; and
    the movable core has a flat surface opposed to an end surface of the fixed core and the projection projects at a center of the flat surface toward the fixed core.

13. The normally open electromagnetic valve according to claim 12, wherein the valve member includes a shaft which extends vertically and a bullet-shaped valve body portion which is connected to the bottom end of the shaft;

a brim is formed at a boundary between the valve body portion and the shaft; and the brim has a larger diameter than the valve body portion.

14. The normally open electromagnetic valve according to claim 1, wherein the movable core is a cylindrical member disposed over the fixed core and the valve member.

15. The normally open electromagnetic valve according to claim 14, wherein the projection has a circular outline which projects from a center of a bottom surface of the movable core.

16. The normally open electromagnetic valve according to claim 15, wherein an outer circumferential surface of the movable core is formed with plural grooves which penetrate vertically through the movable core.

17. The normally open electromagnetic valve according to claim 16,
wherein in an initial position when the movable core is not excited, a tip surface of the projection is located under an end surface of a top portion of the fixed core.

18. The normally open electromagnetic valve according to claim 17, wherein an edge of the holding hole on a side of the movable core is chamfered; and wherein in the initial position when the movable core is not excited, the tip surface of the projection is located within a range of the chamfered edge.

19. The normally open electromagnetic valve according to claim 18, wherein when the movable core is moved to a valve closing position, a part of the projection is located below the chamfered edge.

20. The normally open electromagnetic valve according to claim 19, wherein an area of an end surface of the fixed core is larger than the area of the tip surface of the projection.

* * * * *